(12) United States Patent
Sacra (10) Patent No.: US 6,999,576 B2
(45) Date of Patent: Feb. 14, 2006

(54) SYSTEM CONNECTION ADAPTER AND TERMINAL

(75) Inventor: Gary M. Sacra, Baltimore, MD (US)

(73) Assignee: Verizon Services Corp., Arlington, VA (US)

( * ) Notice: Subject to any disclaimer, the term of this patent is extended or adjusted under 35 U.S.C. 154(b) by 291 days.

(21) Appl. No.: 10/298,807

(22) Filed: Nov. 17, 2002

(65) Prior Publication Data

US 2004/0096048 A1    May 20, 2004

(51) Int. Cl.
*H04M 7/00* (2006.01)
(52) U.S. Cl. .............................. 379/221.13; 379/213.01
(58) Field of Classification Search ............. 379/88.16, 379/211.01, 211.02, 213.01, 221.13, 221.08
See application file for complete search history.

(56) References Cited

U.S. PATENT DOCUMENTS

| | | | | |
|---|---|---|---|---|
| 5,598,464 A | * | 1/1997 | Hess et al. ............. | 379/211.03 |
| 5,689,555 A | * | 11/1997 | Sonnenberg ........... | 379/221.13 |
| 5,732,131 A | * | 3/1998 | Nimmagadda et al. | 379/221.13 |
| 5,832,061 A | * | 11/1998 | Rubin ........................ | 379/88.1 |
| 5,867,570 A | * | 2/1999 | Bargout et al. ......... | 379/221.13 |
| 5,881,145 A | * | 3/1999 | Giuhat et al. ........... | 379/221.13 |
| 5,910,981 A | * | 6/1999 | Bhagat et al. ............. | 379/219 |
| 6,047,055 A | * | 4/2000 | Carkner et al. ......... | 379/221.13 |
| 6,304,641 B1 | * | 10/2001 | Culli et al. ............. | 379/114.22 |
| 6,351,464 B1 | * | 2/2002 | Galvin et al. ............... | 370/356 |

* cited by examiner

*Primary Examiner*—Bing Q. Bui
(74) *Attorney, Agent, or Firm*—Leonard C. Suchyta, Esq.; Joel Wall, Esq.; Rader Fishman & Grauer PLLC (57) ABSTRACT

Existing switch markings for telephone numbers are mechanically manipulated via the Recent Change channel to provide an appropriate treatment. In case a call to a vacant pooled-in number cannot be completed, a terminating switch, instead of generating a REL message with a Cause Code 26 and tearing down the call, connects the call to an Operations Support System that provides a predetermined announcement to a calling party. Calls directed toward numbers that are ported-out are placed on a Machine Intercept, which results in sending a cause code 26 to an originating switch.

13 Claims, 5 Drawing Sheets

FIG. 1
Sheet 1/2

FIG. 1
Sheet 2/2

SYSTEM CONNECTION ADAPTER AND TERMINAL

TECHNICAL FIELD

This invention is directed in general toward telephony systems, and in particular, toward a system for handling calls directed toward a vacant pooled number at a terminating telephone switch.

BACKGROUND

The following acronyms and definitions are used in elaborating the principles disclosed herein.

Acronyms and Definitions

1. Acronyms
ACG Automatic Code Gapping
AMA Automatic Message Accounting
ANSI American National Standard Institute
CdPN Called Party Number
CPE Customer Premises Equipment
FCI Forward Call Indicator
GAP Generic Address Parameter
GTAI Global Title Address Information
GTT Global Title Translation
IAM Initial Address Message
ISDN Integrated Services Digital Network
ISUP ISDN User Part
LARG LIDB Access Routing Guide
LATA Local Access Transport Area
LERG Local Exchange Routing Guide
LIDB Line Information Database
LNP Local Number Portability
LRN Location Routing Number
LSMS Local Service Management System
LU Living Unit
NP Number Portability
NPA Numbering Plan Area
NPAC Number Portability Administration Center
NPDB Number Portability Database
NXX Central Office Code
SCCP Services Connection Control Part
SMS Service Management System
SS7 Signaling System 7
STP Signal Transfer Point
TCAP Transaction Capabilities Application Part
TN Telephone Number 2 Definitions

| | |
|---|---|
| Block Holder Switch | The switch designated by the service provider to which a thousands block (NXX-X)[1] has been assigned for use and allocation to end users. |
| Code Holder Switch | The switch designated by the service provider to which the NXX is assigned in the LERG. |
| Default Routing | The ability of the switch to continue a call based on dialed number when NPDB cannot be accessed due to abnormal circumstances or when NPDB response contains a protocol error. |
| Donor Switch | The switch from which a TN was originally ported. In a number pooling environment, the donor switch is the code holder switch. |
| End User | Business or residential subscriber. |
| Home LRN | An LRN is a Home LRN for a switch if the LRN may be used as a routing number to complete calls to TNs that have been pooled-in or ported-in to the switch (i.e., this LRN is associated with the TNs in the NPDB). To qualify as a home LRN for a given switch, the NPA-NXX of that LRN must be assigned to that switch in the LERG. |
| Intermediate Switch | A tandem switch. |
| Local Access Transport Area (LATA) | A defined geographic area where equal access switches or access tandem switches can provide carrier access to the local switch. |
| Line (TN) Served by Switch | Any TN that is connected to the switch or subtends the switch. The TN may be a physical subscriber connection or a virtual TN. |
| Location Routing Number | A 10-digit number in the format NPA-NXX-XXXX. The first 6 digits of the LRN identify a switch. |
| NP-Capable Switch | A switch that has the NP capabilities described in Technical Requirements for Number Portability - Switching Systems. |
| NP Query | A request for call routing information sent from the switch to the NPDB when a call encounters an NP trigger. |
| NP-Reserved Marking | A switch marking on a TN or range of TNs. |
| Operational User | The service provider's maintenance personnel. |
| Originating Switch | The switch serving the calling party. |
| Pooled Number | A number within a pooled and allocated block of TNs that is working, assignable, or aging in the block holder switch. A pooled number will have a Local Number Portability (LNP) Type[2] of POOL in the NPAC SMS. |
| Pooling Administrator | Entity responsible for the administration of the NXX-X blocks within an NPA. |
| Portable NPA-NXX | An NPA-NXX designated as "open" for portability. It may be the case that no numbers have actually ported. |
| Ported Number | Outside of a pooled block, a TN is ported if it is working, assignable, or aging in a switch other than the code holder switch. Within a pooled block, a TN is ported if it is working, assignable, or aging in a switch other than the block holder switch. A ported number will have an LNP Type[2] of LSPP or LISP in the NPAC SMS. |
| Ported Out Marking | A switch marking on a TN or range of TNs. |
| Rate Center | A geographic area used to distinguish rate boundaries. In this document "rate center" denotes the smallest geographic area used to distinguish rate boundaries. In other contexts, rate centers may contain even smaller geographic areas used for rating (e.g., rate districts, wire centers, rate areas). |
| Recipient Switch | The switch to which a TN is ported. |
| Snapback | The event whereby the responsibility for a ported TN is returned to the block holder (if the TN is in a pooled block) or the code holder (if the TN is not in a pooled block) after disconnect and aging. |
| Unallocated Number | A TN is unallocated on a switch if it is not assigned to a customer on the switch. |

[1]The term NXX-X refers to the NPA-NXX-XXXX of the North American Numbering Plan.
[2]The value of LNP Type is assigned in the NPAC SMS National Number Pooling Requirements Before Congress enacted the Telecommunications Act of 1996, competition between telecommunication carriers was minimal. Central Office codes commonly known as a NXX (NPA-NXX-XXXX) or a block of 10,000 numbers, were in plentiful supply and readily available to existing Local Exchange Carriers (LECs). Little thought was ever given to telephone number conservation. If a LEC inadvertently asked for more numbers than it needed, it would hold the numbers until a future date, when the numbers might be used. It was not uncommon to see CO Codes assigned to a LEC, and remain unused for years. During that period, it was rare to see a CO Code taken out of service or returned, so that the CO Code could be reassigned. In the rare case where a CO Code was taken out of service, or returned, it was a relatively simple matter to give the CO Code back and then reassign the code. If there were a few working customers in the CO Code, they were simply given a telephone number change to remove the customer from the CO Code being returned.

With the implementation of the Telecommunications Act of 1996, however, competition became a reality as numerous new Competitive Local Exchange Carriers (CLECs) entered the market. CLECs entering into business for the first time required telephone numbers to serve customers in the markets they were entering. Additionally, with the introduction of Local Number Portability (LNP), CLECs needed a way to be able to port a customer away from a competitor. In addition to CLECs new to the market, Cellular service has seen dramatic growth. Further, new products came into being, which required additional telephone numbers. All of this resulted in opening new CO Codes at an increasing rate.

As new CO Codes are opened, regulators and industry looked for ways to minimize the opening of new CO Codes and to maximize the use of existing numbers in CO Codes which have already been opened. One of the methods, which has been, and continues to be used successfully, is Number Pooling. Other methods have included Rate Center Consolidation (RCC), sequential numbering, and utilization percentages which companies are required to reach before new resources will be assigned (blocks or CO Codes).

Local Number Portability

Local Number Portability (LNP) is a circuit-switched network capability, which allows an end-user to change Service Provider (SP), location, and/or service type without having to change their telephone number. The three types of LNP are: (a) Service Provider Portability, which allows an end-user to change SP while retaining his/her telephone number; (b) Location (Geographic) Portability, which allows an end-user to change from one geographic area to another (the current Location Routing Number (LRN) model does allow limited location portability within the rate boundaries) while retaining his/her telephone number; and (c) Service Portability—allows an end-user to change service (e.g., Analog to ISDN, etc.) while retaining his/her telephone number with the same Service Provider.

LNP requires a different method of call routing, because a telephone number's switch can no longer be identified by its NPA/NXX. Essential to the implementation of LNP is the ability to associate a network destination with a ported dialed number. This information, identified as a Location Routing Number (LRN), will indicate the specific switching entity that serves the called party, to which the call must be routed. LRN maintains call routing and billing capabilities of wireline carriers.

LRN is a unique 10-digit number assigned to a central office switch, and is assigned to each ported telephone number for call routing purposes and will serve as the network address. The LRNs will be stored in regional Number Portability Administration Center (NPAC) Databases, which are used to update and synchronize the Number Portability routing databases of subtending service providers. To correctly route a call, an Access Carrier (AC) may (a) Query its own Number Portability routing database to obtain the LRN if LNP-capable; or (b) Allow the LEC to route the number to the appropriate switch. Either method results in a charge to the Access Carrier by either NPAC or by the LEC.

LRN technology is used to transfer numbers from one Service Provider (SP) to another SP. A telephone number is "ported in" when a first SP provides service in its switch with a telephone number originally assigned to a second SP's switch. A telephone number is "ported out" when a number assigned to a first SP is moved from the first SP's switch to a second SP's switch.

Telephone Number Pooling

Now that we have seen how changing service providers may be accomplished, we turn to pooling telephone numbers. According to industry experts, the supply of North American telephone area codes is due to run out anywhere from 2005 to 2015. To address this problem, the Federal Communications Commission mandated a technique called Telephone Number Pooling (TNP). TNP aims to exhaust area codes by distributing blocks of one thousand telephone numbers among multiple SPs. The TNP achieves this by using the blocks at the 1000-number, (i.e., at the NXX-X) level rather than at the 10,000-block level.

The process of donating telephone numbers takes place as follows. If a current owner of a block of one thousand NPA/NXX numbers utilizes 10% or less of numbers of a block of numbers, then that owner, for example, Verizon (first SP), is required to donate that thousand block for re-allocation. Once this donated thousand-block has been allocated to a second SP, the first SP of these numbers will remain as the code owner of the NPA/NXX block. Numbers that are thus donated are "ported out." A "block holder" is a recipient SP switch that "owns" a particular thousands-block of numbers. In a number pooling environment, a "code holder" is a donor SP switch.

When number pooling is implemented in a particular geographic area, NXXs are still assigned to a single donor SP (code holder) in the Local Exchange Routing Guide (LERG), but blocks of 1000 numbers are assigned to various service providers (block holders). The recipient SPs (block holders) then determine when to put (activate) their number blocks via the Number Portability Administration Center (NPAC) Service Management System (SMS) and thus service providers' NP routing databases (i.e., NPDBs).

Four scenarios are possible. A donor SP may donate a "clean" block, i.e., a 100% unassigned block of numbers to a second SP. Alternatively the donor SP may donate a block of numbers that is 10% or less utilized by the donor SP. This is called a "contaminated" block. Similarly, the recipient SP may receive a "clean" or a "contaminated" block of numbers. Donating a block is called "pooling (porting) out." Receiving a block is called "pooling (porting) in."

When a donor SP donates a contaminated block of numbers to a recipient SP, a number within this block that is in use with the donor SP's customer can be released from the donor SP and reassigned to the recipient SP after a current user of the number disconnects service with the donor SP. This reassignment of the ported numbers to the new SP is called "snapping" the ported-out numbers to the block owner.

The same situation arises when a contaminated block of numbers is ported in to a recipient SP. In that case, some of the numbers in the ported-in block might be still used by a subscriber of a former SP. After the subscriber disconnects his service with the former SP, the numbers snap in to the recipient SP's pool. The result in both the cases is to achieve over time as nearly clean blocks to each block holder as possible.

The Cause Code 26 Problem

U.S. Pat. No. 5,910,981 to Bhagat et al. provides some information on number portability and cause code 26. That patent is hereby incorporated herein by reference in its entirety. In a Number Portability environment, there are cases where customers port their working directory numbers and some other numbers reserved for assignment that are not yet working in the new service provider's switch. Additionally, there could be ported numbers that have been disconnected from a service provider's switch and are under aging process. Under the current Number Portability implementation, when a call is routed to the service provider's switch with the switch's LRN and a GAP parameter containing one of the non-working numbers or the disconnected numbers under aging process, the switch will treat the call as a misrouted LRN call and provide Cause Code 26 treatment. However, the call is not a misrouted LRN call.

Figure 1:
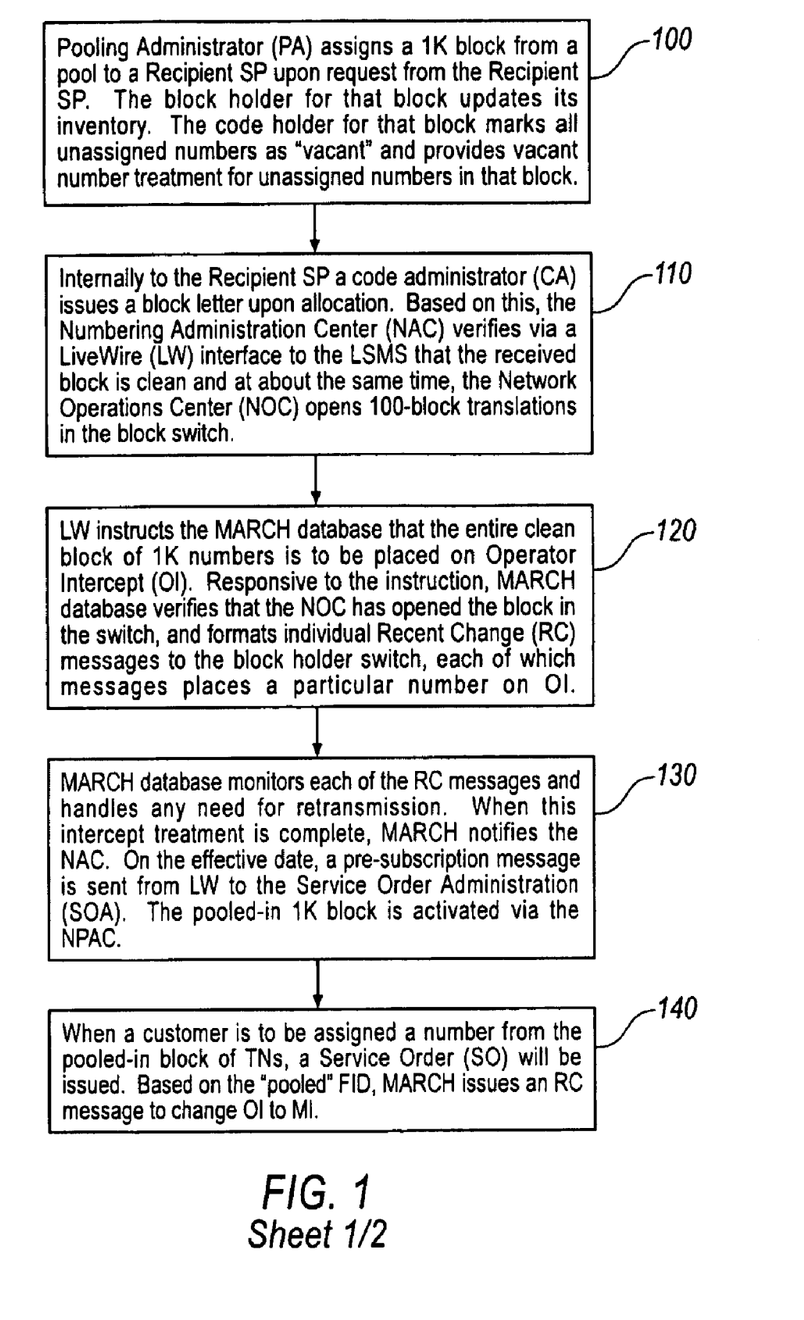
FIG. 1 is a flow chart of steps used in the case of a pooled-in block of clean numbers.

This is further explained as follows. Assume that the block of numbers 919-222-3000/3999 is ported. Assume that the LRN for this block is 919-444. Referring to FIG. 1, suppose a call is made from a switch A to 919-222-3010, which is ported and not assigned, i.e., it is a vacant number. Switch A performs a database query, and routes the call to the assigned owner of the block, which is switch B. But because that number is "vacant" and it has already been dipped, a cause code 26 will be returned to the switch A. Switch A then has the problem of processing this cause code 26. Typically, the calling party will receive fast busy or possibly an announcement indicating that the number is misrouted. But this is an incorrect indication, because the calling party should receive a message that the number is vacant and that the customer should not retry the call to that number.

Ported Out Marking

Another problem is how to, if at all, handle a vacant number in a block that is ported in or ported out. Prior to Number Portability, each NPA-NXX was "owned" by the service provider and typically assigned on a specific switch. With Number Portability, an NPA-NXX can be spread over many switches and not every TN in the NPA-NXX is allocated to a customer of the service provider that historically owned the NPA-NXX. With Number Portability, the TNs that are ported out are marked "ported out" via an administration attribute. This TN is therefore removed from that switch. Note that this TN still exists on another switch. As this "ported out" attribute is set, the switch will provide specific operational messages for errors relating to the provisioning of ported out TNs. One purpose of the "ported out" status indicator is to block inadvertent assignment of TNs that are allocated on another switch.

TN or ranges of TNs are not ported out unless specifically marked as such. The switch also allows the "ported out" status to be provisioned when the directory number is unallocated. In addition, the switch shall allow the "ported out" status to be removed when the directory number is allocated. This prevents a TN with a "ported out" marking from being assigned until the marking is removed, or allows the automatic overwrite of the "ported out" marking, thus allowing the TN to be assigned without manual removal of the marking on the number. The latter action will result in the automatic removal of the marking after the TN is assigned.

Marking NP-Reserved Numbers

To address the cause code 26 problem, one solution is to create a new indicator to indicate that a given TN or a range of TNs is "NP-Reserved" and Cause Code 26 should not be sent for the number or range of numbers, regardless of how a call is routed (i.e., correctly routed or misrouted). Normal unallocated number treatment should be provided for calls to such number or range of numbers. In addition, if a customer ports away numbers that happen to be within the "NP-Reserved" range of numbers, the donor switch should provide Cause Code 26 treatment for LRN routed calls to the ported away numbers since in this case, the calls are truly misrouted LRN calls and Cause Code 26 is provided. This is made possible by allowing the "ported out" marking to override the "NP-Reserved" marking.

TABLE 1

Interplay of NP-Reserved Marking and Ported-Out Number Marking

| | "ported out" indicator set | "ported out" indicator not set |
| --- | --- | --- |
| NP-Reserved mark set | Although the "NP-Reserved" marking is set, since the number is ported away, an LRN routed call to the donor switch would be a misrouted LRN call. So, Cause Code 26 treatment will be provided. | Vacant number treatment will be provided instead of cause code 26 |
| NP-Reserved mark not set | Cause Code 26 treatment will be provided | Regular call processing will apply per the current Number Portability implementation. This includes completing the call if the number is found on the switch or providing Cause Code 26 treatment if the number is not found on the switch. |

In addition to supporting a Number Portability environment, the "NP-Reserved" marking is also used to support a Number Pooling environment. When pooled numbers are activated in the NPDB prior to being assigned to a customer, the "NP-Reserved" marking capability is used to suppress release with Cause Code 26 and instead provide unallocated number treatment. Call processing associated with the "NP-Reserved" marking is as shown in Table 1.

Thus, marking a TN as "NP-Reserved" can help suppress cause code 26 and allow the call to be routed to an intercept system to play an appropriate announcement to be played to a calling party. But this is an expensive solution and is proprietary to the particular vendor or the type of switch. For an operating company that would like open architecture solutions and a uniform solution for a variety of types of switches from different vendors, a solution that is switch-independent is preferred.

To accommodate the transfer of numbers from one service provider to another, it became necessary to establish method of treating a misrouted call made to a ported number. One solution is to send an ISUP Release message (REL) in response to an Initial Address Message (IAM) to an originating switch, and thereby allowing the originating switch to process the call. Typically, in such a case, the originating switch plays the "fast busy" tone to the calling party, which provides no information to the caller as to why the call could not be completed. Accordingly, there is a need for an improvement in the art to address these issues.

SUMMARY

In one aspect, this disclosure is directed toward solving the incompatibility between returning a Cause Code 26 (cc26 in a REL message for a call made to a non-working (vacant) pooled-in telephone number. In accordance with the disclosed method, if a vacant pooled-in number and is on Operator Intercept (OI), that call will route to an Operations Support System (OSS)—which could be a decentralized or a centralized system—where an appropriate announcement message is played. On the other hand, by placing calls that are not vacant pooled-in numbers on a Machine Intercept (MI), a cc26 may be returned in a REL message if that number is a ported number and the call has been routed to the wrong terminating switch.

In another aspect, the disclosure is directed toward utilizing the provisioning systems to determine if a number is to be returned with a cc26. LiveWire (LW) is a telephone number administration system, which determines if a number is ported out based on a "ported out" indicator. When a number is "ported out", the porting Service Order updates LW and notifies the Memory Administration Recent Change (MARCH) database to place that number on machine intercept (MI). If a call, which has already performed an LNP query previously in the call path, routes to that number in the "ported out" switch, because that ported out number is on a MI, then it is deemed to be a true cause code 26 condition. In that case, the terminating switch returns a cause code 26 to the originating switch, which plays a "fast busy" tone to the calling party.

In a further aspect, when a block of numbers is pooled into a switch for assignment, LW examines a "pooled in" indicator, and then instructs MARCH to place these numbers on OI until they are assigned to a customer. When a number is on OI, the terminating switch does not return cc26; instead, it routes any call to the unassigned number to a centralized OSS intercept system. Thus, the Cause Code 26 is suppressed without the usage of the "NP-Reserved" marking. By thus suppressing cc26, this arrangement indicates to the originating switch that the call could be completed at the terminating end. Thus, this method of placing these vacant numbers on OI serves the same purpose as "NP-Reserved" marking and suppresses Cause Code 26 by playing an announcement to a calling party who called the vacant pooled-in TN.

In a yet another aspect, if a "pooled in" number "ports out" to a different service provider and thereafter it is disconnected, the number reverts to the owner of that 1000's block after an "aging" period. In that case, LW determines that it is a pooled in, but ported out number, and places this returning number on OI (and suppresses cc26 after the aging period. While the number was ported out and aging, MARCH had placed the number on a machine intercept. In that case, cc26 is not suppressed and the originating switch may provide a "fast busy" tone or another announcement to the calling party in a cc26-appropriate call scenario.

Because the service order administration system accomplishes this by appropriately provisioning the line to an OI or an MI, this solution does not require additional switch software packs or expensive proprietary solutions.

BRIEF DESCRIPTION OF THE DRAWINGS

These and other features, objects and advantages of the present invention may be readily understood from the following detailed description illustrating the disclosed principles by way of some embodiments with reference to the accompanying drawings, wherein.

DETAILED DESCRIPTION

Using RC Update Process to Place a Vacant Number to an Intercept Service

It has been discovered that by appropriately directing a call terminated to a vacant number to an intercept handling system, one may solve the above-described problem with a returned cause code 26. In an embodiment, this is achieved by using a Recent Change (RC) update to either an Operator Intercept (OI) or a Machine Intercept (MI), one may provision a telephone number (TN) so that an appropriate announcement system can handle a call that is routed to a non-working pooled-in TN.

Service Order Processing System

An overview of a telephony provisioning system is given in U.S. Pat. No. 5,953,389 to Pruett et al. There is described the state of the art in the service order processing system in use in Local Exchange Carriers (LEC). The service order processing system is an administration system for the Public Switched Telephone Network (PSTN) and includes an attendant station for receiving service requests and collecting customer information, credit verification, service order processor (SOP) for creating and distributing service orders for processing by downstream processing systems. Examples of downstream processing systems are a Service Order Analysis and Control (SOAC) system, a Computer System for Mainframe Operations (COSMOS) system, SWITCH system, Loop Facility Assignment and Control System (LFACS) system, and Adjunct Processor (AP) having storage for storing data including Living Unit (LU) (data, network facility data and Telephone Number (TN) data.

Uniform Service Order Codes (USOCs) are used within a service request to clearly identify each billable service, such as call waiting or call forwarding. There are more than 34,000 USOCs that identify the products and services offered today. USOCs identify an exact service, how a customer will be billed and they are used to automate billing and provisioning. USOCs are an extremely important tool for effectively managing a telco's product and service offerings. They are an invaluable product that assists with the maintenance of customer record databases in a clear, concise, and consistent manner. USOCs contain intelligence for software systems that make switching, provisioning, billing and maintenance work more efficiently. When assigned to any product or service that a telecommunications company offers, a USOC and its descriptive information can be used to help a company forecast service trends and work volume.

In addition to USOCs, Field Identifiers (FIDs) are used within a service request to identify important attributes of service beyond those described by USOCs. Specifically, FIDs convey the parameters required to provision a service. For complex services, multiple FIDs may be needed to depict all of the characteristics. Together, USOCs and FIDs describe all aspects of the subscribed service. For example, a USOC may identify call forwarding, while a FID identifies the customer, the number of rings to wait before forwarding occurs, or the phone number to which the call will be forwarded. FIDs provide all the detail necessary to facilitate operations systems flow-through.

The Memory Administration Recent Change (MARCH) system provides automated Service Order flow-through and facilitates manual entry of service request information into End Office (EO) switches.

The Service Order Analysis and Control (SOAC) system manages the flow of service order activity from front-end systems, through the assignment process, to downstream systems. Based on the service order system input, the SOAC system determines which operations systems need to be involved in turning up a service, and provides instruction and sequencing to those operations systems. It identifies service order problems and forwards them to the appropriate locations for resolution. It also supports orders for simple and complex services, and handles revisions, cancellations and completions of these orders. After receiving a service order, the SOAC checks the USOCs/FIDs, determines that the service order should flow through MARCH, strips memory administration codes from the service order, and creates Translation Packets (TP). SOAC then sends the TPs to MARCH.

The following describes the various scenarios under which a call directed to a vacant TN is provided an appropriate treatment as discovered herein.

Scenario I. Clean (Uncontaminated) Block of Pooled-In (Ported-In) Numbers

FIG. 1 depicts the manner in which a service provider would assign the proper treatment to a call directed to a vacant number in a clean (i.e., uncontaminated) block of ported-in numbers. It is assumed that prior to entering the pooling process the involved NPA-NXX of the block being assigned has been opened for porting in the LERG & NPAC.

At step 100, a PA assigns a pooled 1K Block from a pool based on a request from a Recipient SP and distributes the information to all appropriate parties. The PA advises the Recipient SP (Block Holder) of the TN range of the 1K Block being assigned and the effective date of the 1K Block. The holder of that 1K block, the Block Holder, updates its internal TN inventory. On the effective date, the block holder will become the owner of the pooled block. But the pooled-in TNs will not be scheduled for activation to customers until one day after the activate date. At the same time, the PA advises the Donor SP (Code Holder or the LERG Assignee) that the 1K Block was being assigned to the Recipient SP and the effective date of the 1K Block. The code holder provides vacant number treatment to numbers that are ported out and unassigned. NPAC personnel will verify that the NPA-NXX is open for porting in the NPAC. If the NPA-NXX is not open for porting the NPAC personnel will return the request to the PA.

At step 110, internally to the Recipient SP a code administrator (CA) issues a block letter upon allocation. Based on this, the Numbering Administration Center (NAC) verifies via a LiveWire (LW) interface to the LSMS that the received block is clean and at about the same time, the Network Operations Center (NOC) opens 100-block translations in the block switch.

At step 120, LW instructs the MARCH database that the entire clean block of 1K numbers is to be placed on Operator Intercept (OI). This instruction may be provided by way of delivering a Lotus Notes packet to MARCH. Responsive to this instruction, MARCH database verifies that the NOC has opened the block in the switch, and formats individual Recent Change (RC) messages to the block holder switch, each of which message places a particular number on OI.

At step 130, the MARCH database monitors each of the RC messages and handles any fallout, i.e., if there is a need for retransmission. When this intercept treatment is complete, MARCH notifies the NAC. On the effective date, a pre-subscription message is sent from LW to the Service Order Administration (SOA). The pooled-in 1K block is the activated via the NPAC.

At step 140, when a customer is to be assigned a number from the pooled-in block of TNs, a Service Order (SO) will be issued. Based on the "pooled" FID, MARCH issues an RC message to change OI to MI.

If the change from OI to MI for an assigned TN is successful (step 145), MARCH releases the SO (step 150). If not, at step 160, a Call Mediator/PARIS system receives a "reject" message from the switch, which message includes status of the TN. Based on the status, if the TN status is "working", then the SO is rejected. If not, the status is verified to ensure if the change from OI to MI has been successful. If the change is unsuccessful, then step 140 is repeated.

At step 170, a call to a number placed on OI will be routed to a centralized intercept system for an announcement.

Scenario II. Contaminated Block of Pooled-In (Ported-In) Numbers

Figure 2:
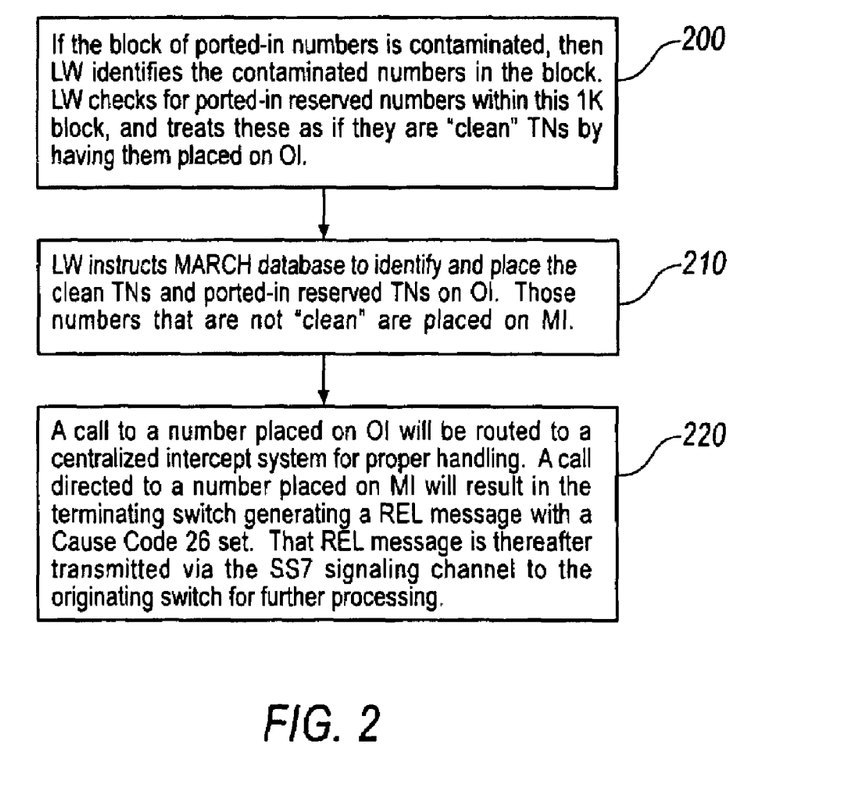
FIG. 2 is a flow chart of steps used in the case of a pooled-in block of contaminated numbers.

Referring to FIG. 2, if the block of ported-in numbers is contaminated, then LW identifies the contaminated numbers in the block (step 200). LW checks for ported-in reserved numbers within this 1K block, and treats these as if they are "clean" TNs by having them placed on OI.

LW then instructs MARCH database to identify and place the clean TNs and ported-in reserved TNs on OI (step 210). Those numbers that are not "clean" are placed on MI. Calls to the numbers placed on OI will be routed to a centralized intercept system for proper handling.

On the other hand, a call directed to a number placed on MI will result in the terminating switch generating a REL message with a Cause Code 26 set. That REL message is thereafter transmitted via the SS7 signaling channel to the originating switch for further processing (step 220).

Scenario III. Clean Block of Pooled-Out (Ported Out) Numbers

Figure 3:
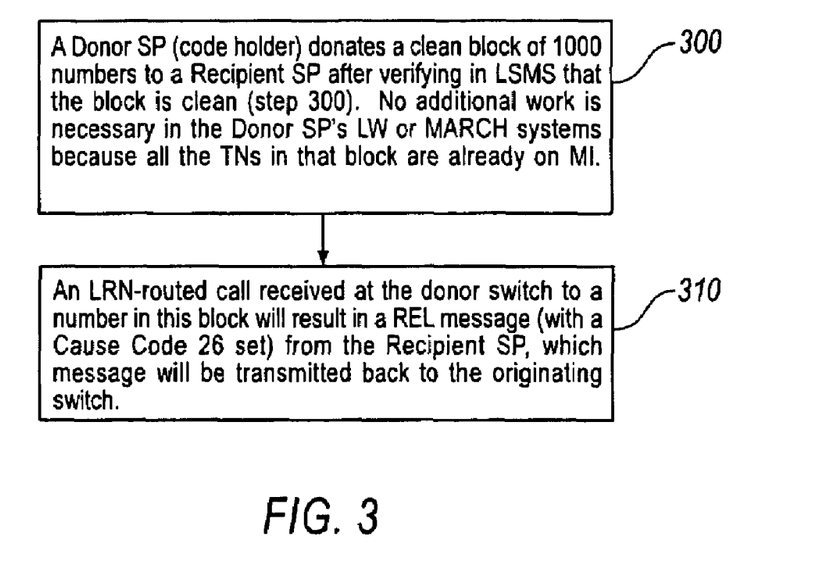
FIG. 3 is a flow chart of steps used in the case of a ported-out (donated) block of clean numbers.

As shown in FIG. 3, in this scenario, a Donor SP (code holder) donates a clean block of 1000 numbers to a Recipient SP after verifying in LSMS that the block is clean (step 300). No additional work is necessary in the Donor SP's LW or MARCH systems because all the TNs in that block are already on MI.

An LRN-routed call received at the donor switch to a number in this block will result in a REL message (with a Cause Code 26 set) from the Recipient SP, which message will be transmitted back to the originating switch (step 310).

Scenario IV. Contaminated Block of Pooled-Out (Ported Out) Numbers

Figure 4:
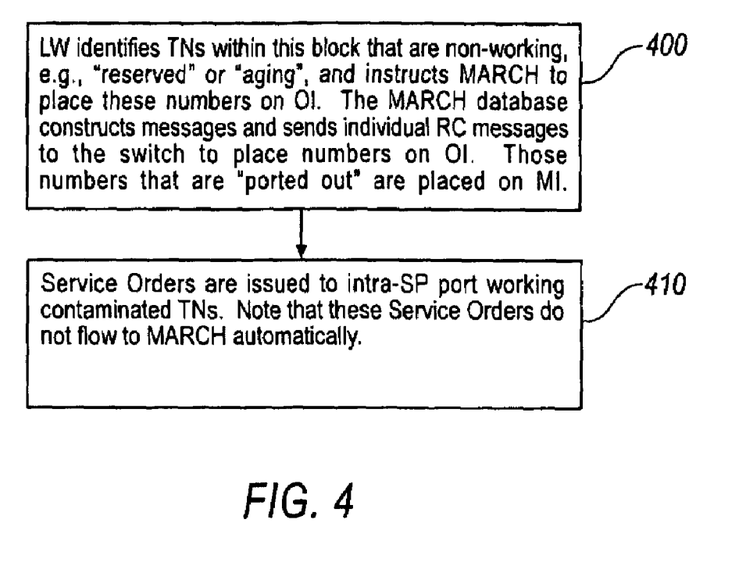
FIG. 4 is a flow chart of steps used in the case of a ported-out (donated) block of contaminated numbers.

FIG. 4 shows how a contaminated block of ported-out numbers is handled. The contaminated numbers are either in use, reserved, or are "aging." Aging Numbers are disconnected numbers that are not available for assignment to another end user or customer for a specified period of time. Numbers previously assigned to residential customers may be aged for no more than 90 days. Numbers previously assigned to business customers may be aged for no more than 360 days. An aging interval includes any announcement treatment period, as well as vacant telephone number intercept period. A number is disconnected when it is no longer used to route calls to equipment owned or leased by the disconnecting subscriber of record.

In this case, LW identifies TNs within this block that are non-working, e.g., "reserved" or "aging", and instructs MARCH to place these numbers on OI (step 400). The MARCH database constructs messages and sends individual RC messages to the switch to place the numbers on OI. Those numbers that are "ported out" are placed on MI (step 410). Service Orders are issued to intra-SP port working contaminated TNs. Note that these Service Orders do not flow to MARCH automatically.

In all scenarios, when numbers snap back, LW places the numbers on OI or on MI based on whether the numbers port-in or port-out respectively (not shown in the figures).

The foregoing describes a way to suppress Cause Code 26 message and simulate a completed call when a call is directed to a vacant pooled number. Persons of ordinary skill in the art may make modifications and adjustments to the disclosed method without undue experimentation. Accordingly, all such modifications and adjustments are to be considered to be within the spirit and scope of the appended claims.

What is claimed is:

1. In a telecommunication system incorporating telephone number pooling, a method of providing intercept treatment to a call directed toward a vacant pooled Telephone Number (TN), the method comprising the steps of:
   determining that the TN is a part of a block of pooled-in TNs;
   determining whether the TN is a part of a clean or a contaminated thousands block of numbers;
   if the block of pooled-in numbers is clean, transmitting at least one Recent Change message to a switching system supporting the block of pooled-in numbers, said Recent Change message specifying Operator Intercept treatment to a call made to a vacant TN in the block whereby Cause Code 26 treatment is suppressed.

2. The method of claim 1 further comprising the steps of:
   if the block of pooled-in numbers is contaminated, transmitting at least one Recent Change message to a switching system supporting the block of pooled-in numbers, said Recent Change message specifying Operator Intercept treatment to a call made to a vacant TN in the block; and
   transmitting at least one Recent Change message to a switching system supporting the block of pooled-in numbers, said Recent Change message specifying Machine Intercept treatment to a call made to an assigned TN in the block.

3. The method of claim 2, further comprising the step of:
   if an LRN-routed call is made to a vacant number placed on Machine Intercept, returning an ISUP Release message with a cause code 26.

4. The method of claim 1, further comprising the step of:
   if a call is made to a vacant number placed on Operator Intercept, routing an incoming call to an OSS to handle that call.

5. The method of claim 1, wherein the step of determining that the block of TNs is pooled-in comprises the step of examining a "pooled-in" indicator.

6. The method of claim 1, wherein the step of determining that the block of TNs is a clean block comprises the step of querying a Local Service Management System (LSMS).

7. In a telecommunication system incorporating telephone number pooling, a method of providing intercept treatment to a call directed toward a vacant pooled Telephone Number (TN), the method comprising the steps of:
   determining that the TN is a "pooled-in" TN of a clean thousands block of numbers;
   determining that the TN is vacant; and
   transmitting a Recent Change message to a switching system supporting the TN, said Recent Change message specifying Operator Intercept treatment to a call made to the TN whereby Cause Code 26 treatment is suppressed.

8. The method of claim 7, further comprising the step of:
   if a call is directed to a vacant number placed on Operator Intercept, routing an incoming call to an OSS to handle that call.

9. The method of claim 7, wherein the step of determining that the TN is a pooled-in TN comprises the step of examining a "pooled-in" indicator.

10. The method of claim 7, wherein the step of determining that the block of TNs is a clean block comprises the step of querying a Local Service Management System (LSMS).

11. The method of claim 7, further comprising the step of:
    if a pooled-in ported-out telephone number snaps back, transmitting a Recent Change message to a switching system supporting the TN, said Recent Change message specifying Operator Intercept treatment to a call made to the TN.

12. The method of claim 7, further comprising the step of:
    if a pooled-out ported-in telephone number snaps back to a recipient SP, transmitting a Recent Change message to a switching system, said Recent Change message specifying Machine Intercept treatment to a call made to the TN.

13. The method of claim 12, further comprising the step of:
    if a call is LRN-routed to a vacant number placed on Machine Intercept, returning an ISUP Release message with a cause code 26.

* * * * *